(12) United States Patent
Petersen

(10) Patent No.: US 9,510,608 B2
(45) Date of Patent: Dec. 6, 2016

(54) METHOD AND APPARATUS FOR MAKING AN AIR-CONTAINING MIXTURE

(71) Applicant: Gram Equipment A/S, Vojens (DK)

(72) Inventor: Tage Petersen, Vojens (DK)

(73) Assignee: Gram Equipment A/S, Vojens (DK)

( * ) Notice: Subject to any disclaimer, the term of this patent is extended or adjusted under 35 U.S.C. 154(b) by 355 days.

(21) Appl. No.: 14/062,936

(22) Filed: Oct. 25, 2013

(65) Prior Publication Data

US 2014/0106043 A1 Apr. 17, 2014

Related U.S. Application Data

(62) Division of application No. 11/887,036, filed as application No. PCT/DK2006/000547 on Oct. 4, 2006, now Pat. No. 8,631,740.

(30) Foreign Application Priority Data

Oct. 7, 2005 (DK) .................................. 2005-01404

(51) Int. Cl.
| | |
|---|---|
| *A23L 1/00* | (2006.01) |
| *A23G 9/20* | (2006.01) |
| *A23G 9/46* | (2006.01) |
| *A23P 1/16* | (2006.01) |

(52) U.S. Cl.
CPC . *A23G 9/20* (2013.01); *A23G 9/46* (2013.01); *A23L 1/0097* (2013.01); *A23P 1/16* (2013.01)

(58) Field of Classification Search
CPC ............ A23L 1/0097; A23G 9/46; A23G 9/34
USPC ..... 426/564, 565, 399, 393; 62/69, 306, 346
See application file for complete search history.

(56) References Cited

U.S. PATENT DOCUMENTS

| | | | |
|---|---|---|---|
| 1,828,853 | A | 10/1931 | Vogt |
| 2,594,442 | A | 4/1952 | Irwin |
| 3,052,557 | A | 9/1962 | Pierre |
| 3,468,137 | A | 9/1969 | Welty |
| 3,479,835 | A | 11/1969 | Lane |
| 3,928,199 | A | 12/1975 | Kirk |
| 3,959,513 | A | 5/1976 | Strohbach |
| 4,157,017 | A | 6/1979 | Reid |
| 4,271,099 | A | 6/1981 | Kukla |
| 5,394,705 | A | 3/1995 | Torii |
| 5,758,571 | A | 6/1998 | Kateman |
| 6,543,248 | B2 | 4/2003 | Cathenaut |

FOREIGN PATENT DOCUMENTS

| | | |
|---|---|---|
| EP | 0218253 B1 | 4/1987 |
| EP | 0351476 A1 | 1/1990 |
| WO | WO92/02146 A1 | 2/1992 |
| WO | 9618310 A1 | 6/1996 |
| WO | WO2004/089102 A1 | 10/2004 |

*Primary Examiner* — Reginald L Alexander
(74) *Attorney, Agent, or Firm* — James Creighton Wray; Meera P. Narasimhan

(57) ABSTRACT

A new method for making an air-containing mixture introduces air into a viscous mass of raw mixture for forming the air-containing mixture. The introduction of air is performed in connection with introducing the mixture in a treating unit. The raw mixture is pumped under pressure through a nozzle for forming at least one jet which is sprayed through an air space against the surface of the mixture. Air is entrained in the jet of the mixture. The air-entraining jet enters the mixture, forming the air-containing mixture. The air-containing mixture formed thereby is subsequently introduced into the treatment unit.

14 Claims, 3 Drawing Sheets

METHOD AND APPARATUS FOR MAKING AN AIR-CONTAINING MIXTURE

BACKGROUND OF THE INVENTION

This application is a division of application Ser. No. 11/887,036 filed Sep. 24, 2007, which claims the benefit of Danish Application No. PA 2005 01404 filed Oct. 7, 2005, and PCT/DK2006/000547 filed Oct. 4, 2006, International Publication No. WO 2007/042027, which are hereby incorporated by reference in their entirety as if fully set forth herein.

The present invention concerns a method for making an air-containing mixture, where air is introduced into a viscous mass of raw mixture for forming the air-containing mixture, and where the introduction of air is performed in connection with introducing the mixture in a treating unit, where the raw mixture under pressure is pumped through a nozzle. The invention also concerns an apparatus for making an air-containing mixture, where air is introduced into a viscous mass of raw mixture for forming the air-containing mixture, and where the introduction of air is performed in connection with introducing the mixture in a treating unit, where a mixing tank is provided between a pipe for introducing the mixture and the treatment unit.

The present invention has appeared in connection with working with mixtures in the form of ice mixtures for treatment in a treatment unit in the shape of an ice cream freezer. However, the general principle of the invention may be used in connection with other forms of mixing, where there is a need for admixing air in a viscous unit before introducing in a treatment unit.

A continuous ice cream freezer is in principle a scraper heat exchanger in which a fluid mass (called ice mixture) is cooled and partly frozen at the same time as stirring and admixing of air are performed, often in almost as large amounts as the fluid mass so that the finished product (ice cream) is a highly viscous foam.

The scraper heat exchanger is most frequently designed as a pipe (called a freezer tube) which is cooled externally and with a rotating shaft (called scraper shaft) inside. On the rotating shaft is mounted a number of knives that scrape the frozen ice off the pipe as well as producing a certain mixing action due to their movement through the product. The shaft itself may be designed in different ways; sometimes just as a fixed shaft, at other times with a built-in eccentric shaft, possibly with rotors mounted thereon which assist the admixing process.

Normally, the air is supplied through a check valve in immediate vicinity of the pipe where the fluid mass is introduced in the freezer tube.

The admixing of air then occurs exclusively by means of the movement of the scraper shaft through the mass (and thereby the movement of the knives and the eccentric/the rotors).

The entire production process of the ice cream normally occurs under pressure (typically 3-4 bars) as the ice mixture is pumped into the freezer tube by means of a mixing pump, and the ice cream leaves the freezer tube in a controlled way, either by means of a pump or by a suitable restrictor that ensures a correct pressure in the freezer tube itself.

Depending on which type of ice cream to be produced by the freezer, it may be advantageous to operate with different rotational speeds of the scraper shaft. For a very fluid product with high air content, a high speed is required to get the air "whipped" into the product. By a very firm, extrudable product, a lower speed is better in order not to add heat in the form of mechanical energy to the product.

At a very low rotational speed, such as required by a very firm ice cream, it may be difficult to achieve a sufficient mixing of ice mixture and air, whereby there is a risk of variations in the density of the product, large air bubbles and the like. Today, this is often solved by mounting a motorised pre-whipper at the inlet of the freezer tube. The pre-whipper is normally comprised by a number of stators and a number of rotors with small mutual spacing, where the rotors are driven by an electric motor.

Air and ice mixture are supplied together at the inlet of the pre-whipper, and when passing through the pre-whipper the air bubbles are broken due to the intensive movement, so that the freezer is thus receiving a ready-whipped foam for cooling/freezing.

The greatest drawbacks of a pre-whipper is the price and the increased maintenance of bearings and sealings in it.

OBJECT OF THE INVENTION

It is the object of the present invention to indicate a system which includes a method and an apparatus for making an air-containing mixture, whereby the drawbacks of the prior art are avoided and so that it is particularly avoided to provide a motorised pre-whipper at the entrance of a treatment unit. It is a further object to indicate such a system where it is possible also to provide an air-containing mixture with uniform density.

DESCRIPTION OF THE INVENTION

According to the present invention, this is achieved by a method of the type specified in the introduction, which is peculiar in that by pumping the raw mixture through the nozzle, at least one mixing jet is formed which is sprayed through an air space against the surface of the air-containing mixture in a mixing step, so that air is entrained into the mixture, and that the air-containing mixture formed thereby is subsequently introduced in the treatment unit.

The apparatus according to the invention is peculiar in that the mixing tank is partly filled with air-containing mixture, that in this mixing tank there are provided an air intake for supplying air to the mixing tank, a nozzle for pumping the raw mixture in under pressure for forming at least one mixing jet which through an air gap is sprayed against the surface of the air-containing mixture in the mixing tank, and an outlet for air-containing mixture for connection to the treatment unit.

Traditionally, a pump is used for pumping the mixture into the treatment unit. This pump is used simultaneously for pumping the mixture through the nozzle before entering the treatment unit.

At the passage through the nozzle, the mixture experiences a pressure drop, thereby attaining high speed and emerging from the nozzle as a jet with a certain penetrating force. If letting the jet pour down into the mixture surface above which an air space is situated, the jet will draw some air in the form of bubbles down into the mixture as well as these bubbles will be torn apart due to the great difference in speed between the jet and the relatively static mixture. In other words, the jet will be able to produce a fine foam of mixture and air in the surface of the mixture in the impact area.

Due to the penetration force of the jet, a pre-whipping is provided in which admixing of air into the mixture is established, without need for extra motors for whipping air into the mixture. Maintenance of bearings, sealings etc required in connection with a pre-whipping unit is thus avoided.

When the idea of the invention is used in connection with ice cream production, the mixture will be a raw mixture of ice cream and the treatment unit will be a freezer tube.

In general, a system according to the invention will therefore consist of an independent unit which can be inserted into a known apparatus between a mixer pump and the point where the mixture is fed into the treatment unit.

In general, it may be said that the system according to the invention will include:
- a nozzle, possibly with variable geometry in order to operate optimally at varying flow rates;
- a tank in which a suitable level of mixture with an air space above the mixture is maintained;
- an air supply, typically by means of a check valve;
- an inlet into which the mixture is fed, possibly as a part of the tank;
- an outlet where the finished whipped foam is conducted on to the freezer tube, possibly made as a part of the tank;
- optionally a bypass enabling a high rate of flow with low pressure drop under so-called CIP-cleaning (Cleaning In Place). This bypass may possibly also open the nozzle for flushing through.

DESCRIPTION OF THE DRAWING

The invention will then be explained in more detail with reference to the accompanying drawing, where.

DETAILED DESCRIPTION OF THE INVENTION

Figure 1:
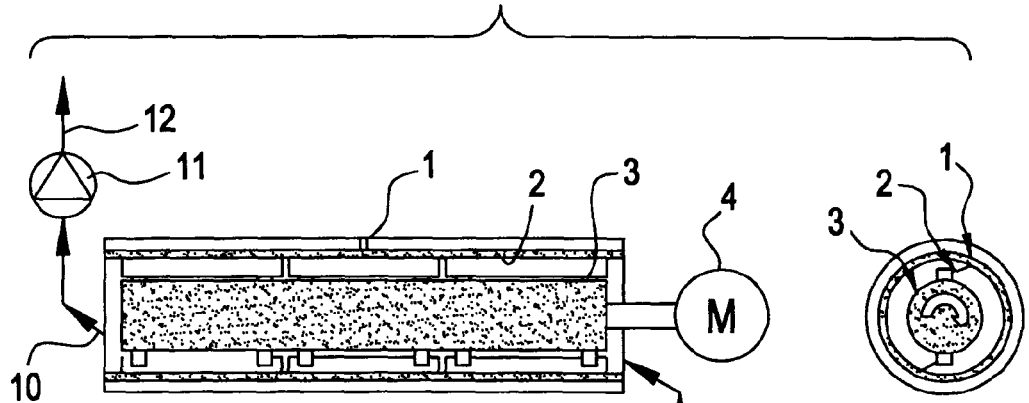
FIG. 1 shows a schematic view of a prior art system for making an air-containing ice cream for introducing into an ice cream freezer.

In FIG. 1 is shown a freezer tube 1 in which is provided a knife 2 which scrapes frozen ice off the tube and partly provides admixing of air due to their movement through the product. The knives are therefore provided on a scraper shaft 3 which is driven by a motor 4 for establishing the rotational movement.

A raw mixture 5 is introduced by means of a pump 6 via a pipe 7 to the freezer tube. In the pipe 7 air 8 is supplied via a check valve 9 into the raw mixture pumped in.

The freezer tube has an outlet 10 which is connected with a pump 11 to pump out air admixed ice cream 12 from the freezer pipe.

Figure 2:
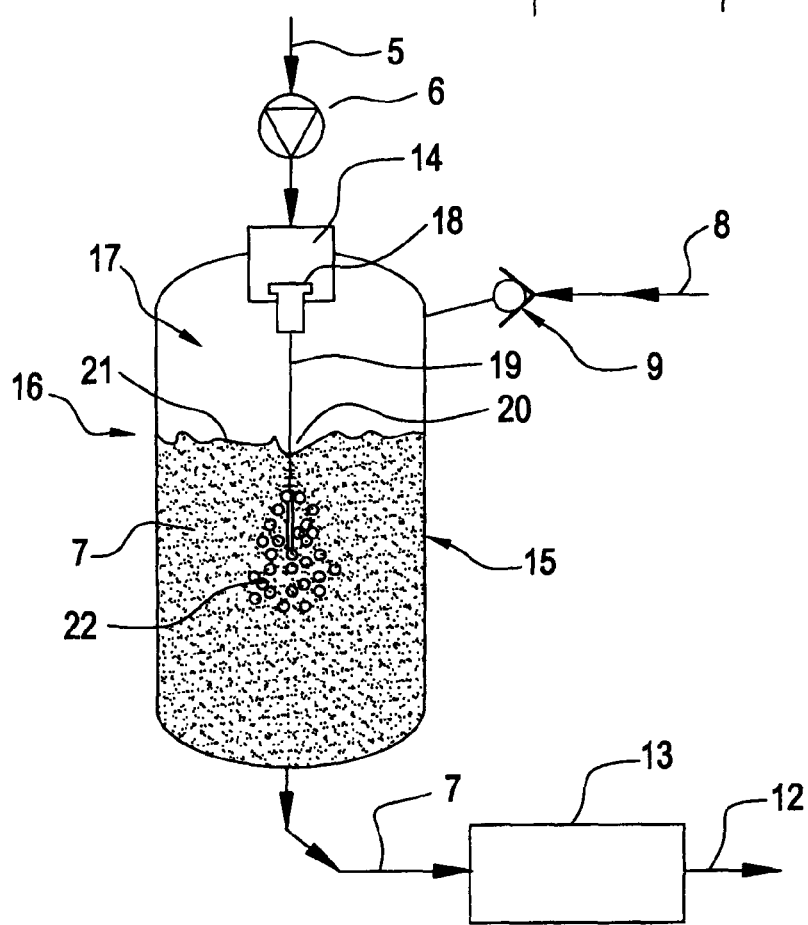
FIG. 2 shows a schematic view of a first embodiment of an apparatus according to the invention.

FIG. 2 shows an apparatus according to the invention. In this case as well, the raw mixture 5 is conducted by means of a pump 6. Air 8 is supplied via the check valve 9. Raw mixture 7 admixed with air is introduced into a treatment unit 13, which e.g. may be a freezer tube corresponding to the freezer tube shown in FIG. 1. The ready mixture 12 is drawn from the treatment unit 13 by means of a pump (not shown). In this situation, the raw mixture admixed with air will appear as a mixture foam which is conducted to the treatment unit 13.

A mixture inlet 14 for a mixing tank 15 is provided in the apparatus, where mixture 7 admixed with air is provided in a lower part of the tank so as to extend to a level 16. Above the level 16 there is provided a space 17 which is introduced via the line 8 to the mixing tank 15. In the shown situation, the air supply appears in the upper part of the tank in the space 17 where air is provided. Alternatively, the supply may be effected at a position below the level 16, i.e. into the air-admixed mixture.

In the inlet 14, a nozzle 18 is provided. Under the action of the pump 6, the ice mixture is thus pumped through the nozzle so that a pressure drop occurs, whereby the mixture is provided a high speed when emerging from the nozzle as a jet 19. This jet has a penetrating force providing that it strikes the mixture face in an impact area 20 in the mixture surface 21. The jet 19 will hereby entrain air in the form of bubbles 22 into the mixture so that a mixture admixed with air is formed. The jet 19 will thus be capable of forming a fine foam consisting of a mixture of mixture and air. This mixed foam is drawn via the connecting line 7 to the treatment unit 13.

Due to the speed of the jet, a stifling in the tank is also produced, ensuring that the foam will not settle in the upper part of the mixture but will be well mixed into the entire volume of the mixture.

As an example can be mentioned that at a capacity of about 1000 l/hr, stirring may be established in the entire mixing tank when this is largely cylindric and has a diameter of about 100 mm and a length of 250-300 mm at a pressure drop between 1 1/2 and 2 bar across the nozzle and with jet speeds of about 15-20 m/s.

The nozzle 18 may be provided as a nozzle producing a single jet, or with a slotted aperture for formation of a fan-shaped jet. Alternatively, there may be provided a nozzle forming more jets which are directed against different areas of the surface 21, in order thereby to utilise the volume of the mixing tank 15 optimally.

The nozzle 18 can be made adjustable so that it has variable geometry, whereby an approximately constant speed for the jet 19 can be maintained over a wide range of flow rates. The area of the nozzle aperture can be changed so that a greater flow goes through the nozzle with the same pressure drop across the nozzle. The nozzle 18 may e.g. be changed by adjusting a slotted nozzle 18d aperture by means of a rotatable piston inside the nozzle, or by blocking more or less of a number of nozzle apertures 18c in a multiple nozzle.

Figure 2A:
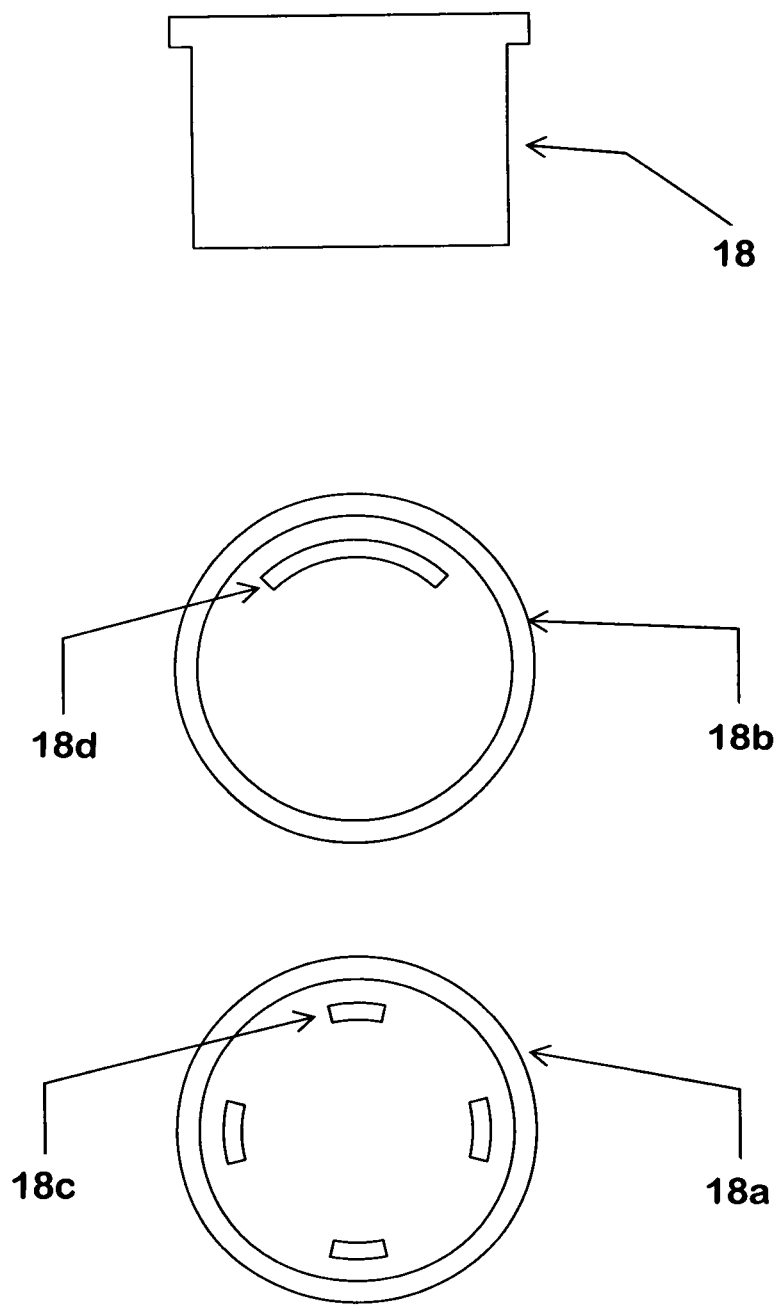
FIG. 2a shows a schematic view of the nozzle and end openings.

FIG. 2a shows a schematic view of the nozzle and end openings. Nozzle end 18a has multiple openings 18c. Nozzle end 18b has a slot opening 18d forming a fan.

Figure 3:
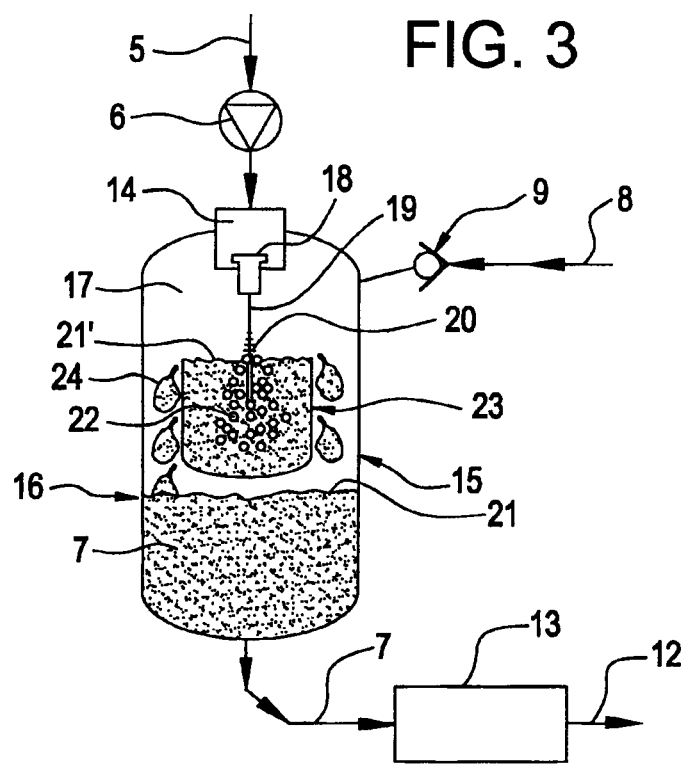
FIG. 3 shows a schematic view of a further embodiment of an apparatus according to the invention.
Figure 4:
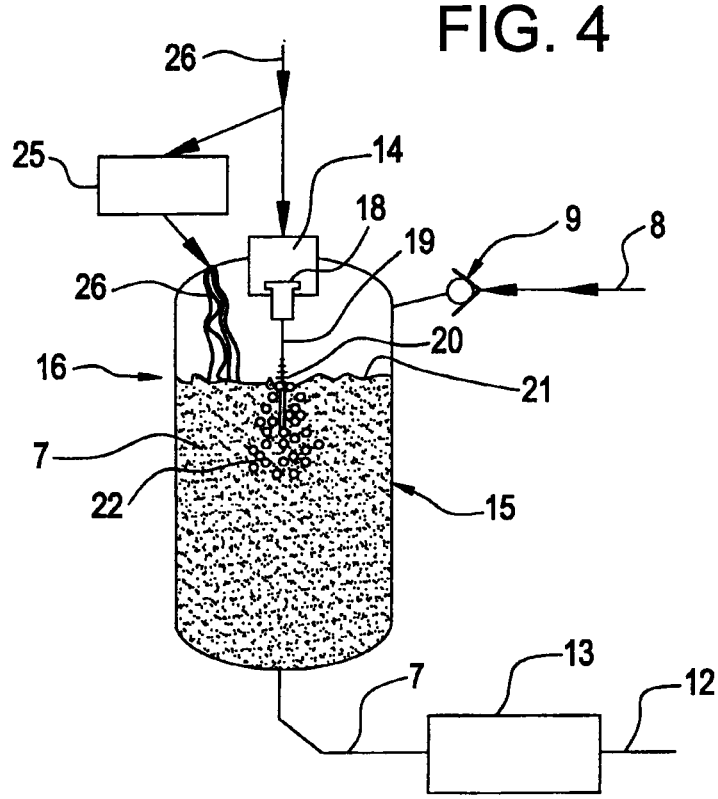
FIG. 4 shows a schematic view corresponding to FIG. 2 with integrated bypass for cleaning.

In FIG. 3 an alternative embodiment is illustrated, where a vessel 23 is provided in the mixing tank 15. The mixer jet 19 strikes down into the surface 21' of the ice mixture provided in the vessel 23. Hereby, air in the shape of bubbles 22 are entrained down into the mixture in the vessel 23. When the vessel 23 is filled, an overflow 24 of foam/ice mixture admixed with air is formed and runs down into the bottom of the mixing tank 15. Thus an ice mixture admixed with air will be provided up to the level 16 in the bottom of the mixing tank 15.

By this embodiment, it will be possible to concentrate the action of the jet 19 to a limited volume of ice mixture. This may provide a better whipping and thereby better admixing of air. Besides, turbulence at the outlet of the mixing tank 15 is avoided. Thus it becomes possible to avoid that large bubbles can be drawn out via the outlet 7. Large bubbles may rise in the air-mixed ice mixture 7 located at the bottom of the mixing tank 15.

The nozzles used in an apparatus according to the invention may provide one jet or be provided as multiple nozzles forming a bundle of jets in order to act on a larger part of the mixture surface 21. Alternatively, the nozzle may be provided as a film nozzle with a slotted aperture, so that a fan-shaped jet is provided. This fan-shaped jet may either be rectilinear or curving. The nozzle 18 may be fixed or be mounted for turning so that the jet can be directed to different areas 20 of the mixture face 21.

In an apparatus according to the invention, there may thus, as illustrated in FIG. 2, be incorporated a bypass 25 which is activated during cleaning. Cleaning liquid 26 may hereby be introduced into the mixing tank 15 via the bypass 25 around the normal liquid flow, which is illustrated in FIG. 2 for the sake of clarity. However, raw mixture 5 and cleaning liquid 25 will not be introduced in the mixing tank 15 simultaneously. A bypass may also be incorporated in other embodiments of the apparatus according to the invention.

In the above, the invention is explained with reference to specific embodiments in connection with making ice mixture in a freezer tube. However, the invention may also find application in connection with other kinds of mixture to be admixed with air before entering into a treatment unit. This is the case with other kinds of confectionery products, but may in principle be applied in connection with any viscous product in which air is to be admixed before treatment is to be performed.

The invention claimed is:

1. A method for making an air-containing mixture, comprising:
   providing a supply source of a viscous mass of raw material,
   providing a nozzle for receiving and supplying the raw material from the supply source,
   providing a pump coupled to the supply source and the nozzle,
   providing a mixing tank,
   providing an air source,
   pumping the raw mixture under pressure through the nozzle into the mixing tank,
   introducing air into the viscous mass of the raw material after pumping the raw material into the mixing tank and forming the air-containing mixture,
   forming an air space above the air-containing mixture in the mixing tank,
   forming at least one mixing jet by the pumping of the raw material through the nozzle,
   spraying the at least one mixing jet in the air space against the surface of the air-containing mixture,
   mixing air with the at least one mixing jet into the air-containing mixture in the mixing tank below the air space,
   entraining the air in the air-containing mixture and forming a final air-containing mixture, and
   introducing the final air-containing mixture into a treatment unit.

2. A method according to claim 1, wherein the viscous mass is an ice mixture, and the treatment unit is a freezer.

3. A method according to claim 1, wherein the formed jet is imparted such a speed that a foam of raw mixture and air is formed in the surface of the mixture in the region of impact.

4. A method according to claim 1, wherein there is maintained a largely constant jet speed across a range of flow rates as the nozzle is imparted a variable geometry.

5. A method according to claim 1, wherein a bundle of jets is formed which is sprayed against various points of the surface, while a substantial part of the surface is utilised for the introducing of air.

6. A method according to claim 1, wherein the jet is fan-shaped for forming an elongated impact area in the surface.

7. A method of making an air-containing mixture, comprising providing a mixing tank, partially filling the mixing tank with mixture, introducing the air into the viscous mass of raw material in connection with the introduction of the raw material in the treating unit by providing air in the mixing tank above the mixture, pumping the raw material under pressure through a nozzle into the mixing tank through the air above the mixture and forming a mixing jet, spraying the mixing jet through the air above the mixture and introducing the air into the mixture and spraying the mixing jet against a surface of the air-containing mixture for introducing air into the mixture and flowing the air containing mixture to the treatment unit, where the air is introduced into the viscous mass or raw mixture for forming the air-containing mixture, and where the introduction of air is performed in connection with the introducing the air containing mixture in a treating unit, where the mixing tank is provided between the pipe for introducing the mixture and the treatment unit, wherein the mixing tank is partly filled with the air-containing mixture, that in this mixing tank there are provided the air intake for supplying air to the mixing tank, the nozzle for pumping the raw mixture in under pressure for forming at least one mixing jet which through an air gap is sprayed against the surface of the air-containing mixture in the mixing tank, and providing an outlet from the mixing tank for the air-containing mixture for connection to the treatment unit.

8. The method according to claim 7, further comprising freezing the air-containing mixture in the treatment unit, which is an ice cream freezer.

9. The method according to claim 7, wherein the providing the nozzle further comprises providing a variable geometry nozzle and further comprising maintaining an approximately constant jet speed over a wide range of flow rates.

10. The method according to claim 7, wherein the providing the nozzle comprises providing a multiple nozzle forming a bundle of jets and further comprising directing the jets spraying against various points of the surface.

11. The method according to claim 7, wherein the providing the nozzle comprises providing a film forming nozzle producing a fan-shaped jet with an elongated impact area on the surface.

12. The method according to claim 7, further comprising providing a vessel or reservoir into which the mixing jet is spraying within the mixing tank.

13. The method according to claim 7, further comprising providing a bypass for flowing cleaning-in-place liquid at a high flow rate with low pressure drop into the mixing tank.

14. A method for making an air-containing mixture, comprising introducing air into a viscous mass of raw material for forming the air-containing mixture, and where the introduction of air is performed in connection with introducing the material in a treating unit, where the raw material under pressure is pumped through a nozzle, wherein by pumping the raw material through the nozzle, at least one mixing jet is formed which is sprayed through an air space against the surface of the air-containing mixture in a mixing step, so that air is entrained in the mixture and that the air-containing mixture formed thereby is subsequently introduced into the treatment unit, wherein a bundle of jets is formed which is sprayed against various points of the surface, while a substantial part of the surface is utilized for the introducing of air.

* * * * *